(12) United States Patent
Hämmerle (10) Patent No.: US 9,984,598 B2
(45) Date of Patent: May 29, 2018

(54) FURNITURE PART FUNCTIONAL ELEMENT

(71) Applicant: Grass GmbH, Höchst (AT)

(72) Inventor: Johannes Hämmerle, Höchst (AT)

(73) Assignee: Grass GmbH, Höchst (AT)

( * ) Notice: Subject to any disclaimer, the term of this patent is extended or adjusted under 35 U.S.C. 154(b) by 16 days.

(21) Appl. No.: 15/003,167

(22) Filed: Jan. 21, 2016

(65) Prior Publication Data

US 2016/0217715 A1 Jul. 28, 2016

(30) Foreign Application Priority Data

Jan. 28, 2015 (DE) ........................ 20 2015 000 619

(51) Int. Cl.
| | | |
|---|---|---|
| *A47B 97/00* | (2006.01) | |
| *G09F 3/16* | (2006.01) | |
| *A47B 95/04* | (2006.01) | |
| *F16B 2/06* | (2006.01) | |

(52) U.S. Cl.
CPC ................ *G09F 3/16* (2013.01); *A47B 95/04* (2013.01); *A47B 97/00* (2013.01); *F16B 2/06* (2013.01); *A47B 2220/008* (2013.01)

(58) Field of Classification Search
CPC .......... A47C 23/02; A47C 23/053; A47C 7/00
See application file for complete search history.

(56) References Cited

U.S. PATENT DOCUMENTS

| | | | | |
|---|---|---|---|---|
| 4,592,106 A | * | 6/1986 | Hagemeister | A47C 23/002 24/652 |
| 5,519,903 A | * | 5/1996 | Constantinescu | A47C 23/05 5/247 |
| 5,639,071 A | * | 6/1997 | Kitchen | A47C 23/05 267/100 |
| 6,409,132 B2 | | 6/2002 | Heisler et al. | |
| 6,688,567 B2 | | 2/2004 | Fast et al. | |
| 7,434,341 B2 | | 10/2008 | Brinkman et al. | |

FOREIGN PATENT DOCUMENTS

DE 1926592 U 11/1965

* cited by examiner

*Primary Examiner* — Amy Sterling
(74) *Attorney, Agent, or Firm* — Edell, Shapiro & Finnan LLC (57) ABSTRACT

A furniture part functional element for decoration or information display, such as for logos or the like, includes: a planar information section and a fastening section equipped with a fastener configured to fasten to the furniture part. The fastener of the fastening section comprises a sliding guide element, via which sliding on a guide section of the furniture part is enabled, and a clamping element, via which the slid-on functional element is held clamped to the guide section.

14 Claims, 7 Drawing Sheets

FURNITURE PART FUNCTIONAL ELEMENT

CROSS REFERENCE TO RELATED APPLICATIONS

This application claims foreign priority under 35 U.S.C. § 119(a)-(d) to Application No. DE 202015000619.1 filed on Jan. 28, 2015, the entire contents of which are hereby incorporated by reference.

FIELD OF THE INVENTION

The invention relates to a furniture part functional element for decoration or information display, in particular in the form of logos or company labels or the like, with a planar information section and a fastening section of the furniture part functional element equipped with a fastener configured to fasten to the furniture part.

BACKGROUND

Furniture part functional elements are generally known in the furniture industry. Using these functional elements, furniture parts, e.g., the frame of a drawer or a drawer guide are provided with information, a logo of the manufacturer or of the installer or generally as a design element.

Since there are, e.g., different types of frame variants on the market, the functional elements are sometimes fastened as simple adhesive elements or as an imprint on a visible area of the outer surface. It is also known that a depression is milled into the outer surface, in which a badge can be fastened, e.g., glued in, locked in or inserted. Dismantling the badge or removing an adhesive element or imprint is virtually impossible. Often the surface is damaged in this regard or it is no longer closed or covered, e.g., in the case of milling. Furthermore, a tool is required both for assembly and also for dismantling, which is sometimes only available to the manufacturer. Lastly, the dismantling is often associated with the destruction of the badge. Missing badges can often no longer be obtained or can only be obtained with great difficulty.

SUMMARY

The object underlying the invention is thus to provide a furniture part functional element, which is assemblable and dismantlable without tools and for which the furniture part does not require any particular arrangements on the visible surface. In addition, the functional element with the information or the logo should be able to be exchanged for other functional elements without problems. If it is desired, the functional element should also be completely removable, without this being noticed on the furniture part as damage or as a defect.

The object is achieved according to the invention in the case of a furniture part functional element of the type mentioned in the introduction in that the fastener of the fastening section comprise a sliding guide element, via which sliding onto a guide section of the furniture part is enabled, and a clamping element, via which the slid-on functional element is held clamped to the guide section.

The furniture part functional element according to the invention thus comprises a fastener, which has two components, namely, on the one hand a sliding guide element, via which the functional element can be slid or guided in the longitudinal direction, e.g., to a side panel of a drawer or a guide rail. The functional element thus performs an exact movement and comes to lie at the desired location on the furniture part. On the other hand, the clamping element serves to hold the slid-on guide element in the desired position such that it is not slid out of this position or does not go missing. The sliding guide element and the clamping element can be designed as separate component elements, thus independent of each other in the functions thereof, wherein the sliding guide element initially brings the functional element into the desired position and then the clamping element fixedly holds the functional element in this position.

In the case of a refinement of the invention, the sliding guide element comprises a guide groove open in the direction of at least one front side of the furniture part, via which the furniture part is slidable from the front side in question onto the sliding guide element and/or is slidable into the guide groove. The guide groove is thus located between the information section and the fastener. The guide groove is, in this regard, designed such that it bears the guide section of the furniture part or such that the guide section comes to lie in the guide groove and slides in the guide groove virtually in the form of a rail. The front wall of the furniture part normally points downwards such that the sliding guide element and the clamping element cannot be seen in the use position of the furniture part, but only the information section.

The guide groove preferably comprises two opposing groove walls, of which one is formed by a rear side of the information section and the other by the fastening section, and a groove base, which is formed by a base section connecting the information section and the fastening section to each other. The base section reaches under the guide section of the furniture part and reaches from the area of the front side wall thereof (visible wall) into the area of the rear side wall thereof (rear or inner wall). The two groove walls and the groove base form, in the widest sense, a U-rail open in the direction of the guide section of the furniture part to be received.

In the case of a refinement of the invention it is provided for the clamping element to comprise at least one, in particular a plurality of elastically flexible clamping fingers, which are elastically retractable for the sliding on of the functional element and subsequently lie in a clamping position in clamping engagement with the guide section. When the functional element is slid on, the clamping fingers are elastically pivoted such that they either lie at a distance to the furniture part or only touch the latter, however, they do not penetrate or lock into the latter. The functional element is thus freely displaceable with respect to the guide section.

In the case of a preferred embodiment, a plurality of clamping fingers are provided in the longitudinal direction of the functional element arranged in series one behind the other. Using this plurality of clamping fingers, different positions of the functional element can be adopted, depending on which clamping finger penetrates into which fixing seat on the furniture part in the end position. A plurality of clamping fingers can also penetrate into one or a plurality of fixing seats in the end position.

According to the invention, the at least one clamping finger comprises a pivot bearing section, which is, in particular, integrally attached to the base section of the guide groove. The clamping force and the elastic capacity of the clamping finger are set via the pivot bearing section. In this regard, the base section remains largely undeformed when the functional element is slid on.

In the case of a variant according to the invention, it is provided for the at least one clamping finger to comprise a central section, which is arranged substantially parallel to the rear side of the information section in the clamping position. The clamping force and the elastic capacity of the clamping finger can also be set over the length, alignment and inclination of the central section. In addition, the functional element only slightly enlarges the thickness of the furniture part.

With particular preference, the clamping finger comprises a clamping section, which lies in engagement with the guide section of the furniture part in the clamping position. In this regard, at least one clamping lug protruding inwards towards the information section is arranged on the clamping section. This clamping lug serves as a lock element and automatically locks to the guide section when the functional element adopts the end position thereof.

A feature according to the invention makes provision for a position fixing element to be provided to fix the position of the functional element in the slid-on position in and counter to a sliding direction or perpendicular thereto. This position fixing element can also be formed by the clamping lug, which lock into the guide section. In another variant, the position fixing element comprises one or a plurality of separate elements, which are also provided on the clamping element and are also manually actuatable, as appropriate.

In this regard, in the case of a refinement of the invention according to the invention, the position fixing element can comprise at least one clamping lug, in particular designed on the at least one clamping finger, which penetrate into a fixing seat on the guide section of the furniture part in the slid-on state and in the desired position of the functional element. The position of the fixing seat is, in this regard, selected such that they are not visible even after the dismantling of the functional element and do not change or destroy the visible surface of the furniture part.

Preferred embodiments according to the invention make provision for the information section to comprise a flat, in particular planar, deepened or raised front side, which is, in particular provided with a print reproducing information and/or an image. In this regard, the manufacturer or installer, serial numbers, a logo, braille script or a colored surface can be printed on and/or the information can consist of another material or the visible surface can comprise a complete or partial, i.e. partial different structuring.

Configurations of the furniture part functional element according to the invention make provision for them to consist of metal and/or plastic, in particular in the form of a plastic injection molded part, pressure die-casting, stamped part, sheet metal part or a metal buckle. Functional elements of this type can be adapted not only to the desired design, but also to the high level of quality of the furniture part. In addition, functional elements of this type allow simple manufacturing and the trouble-free assembly thereof on the furniture part.

The invention also relates to a furniture part, with a furniture part functional element, which comprises a planar information section and a fastening section equipped with a fastener, via which it is fastened to the furniture part, wherein the furniture part functional element comprises the previously mentioned and following features, which are implemented either in any desired combination or also individually on the functional element.

In this regard, the furniture part can be designed, e.g., as a door, drawer, pull-out or cover. The functional element is preferably mounted on a movable furniture part and on a visible surface.

Further advantages, features and properties of the invention emerge from the following description, in which two exemplary embodiments of the invention are described in detail with reference to the drawing. In this regard, the features mentioned in the drawing as well as in the claims and the description are each implemented individually per se or in any combination on the functional element.

DETAILED DESCRIPTION

Figure 1:
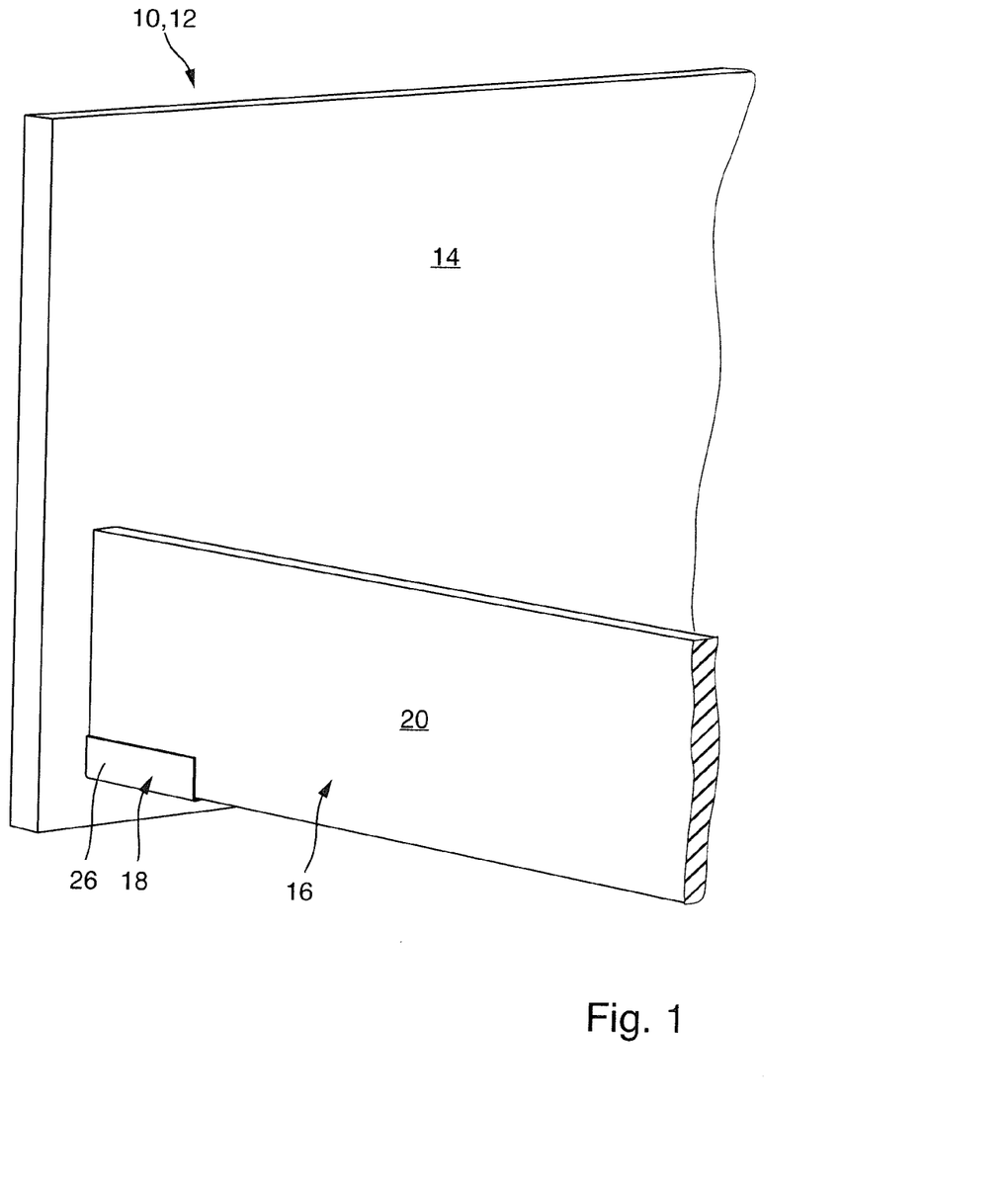
FIG. 1 a perspective view of a section of a pull-out with a side panel.

FIG. 1 shows a section of a furniture part 12 designed as a pull-out 10, from which a front plate 14 as well as a side panel 16 are visible. A functional element 18 is located on the visible side surface of the side panel 16, which can be used as an information carrier and/or design element.

Figure 2:
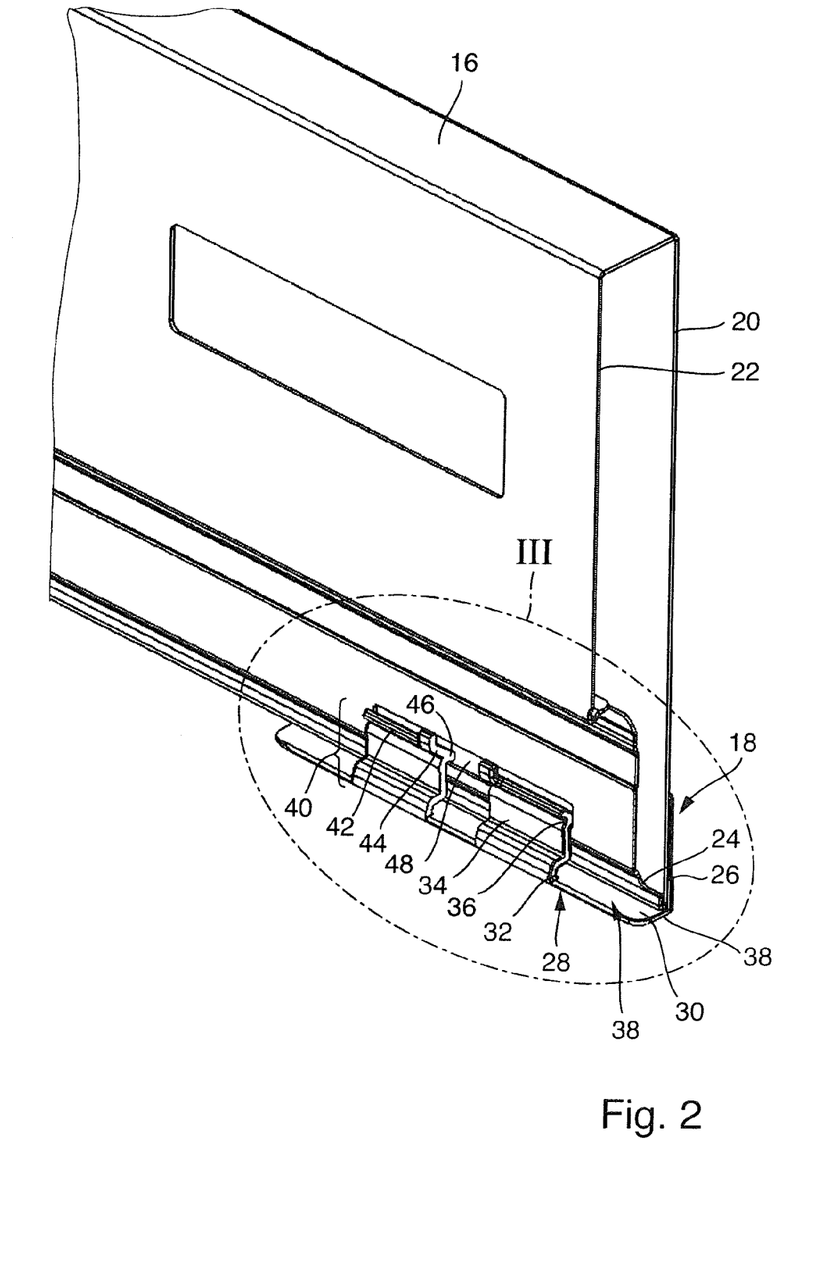
FIG. 2 a perspective view of the inside of a section of the side panel according to a first exemplary embodiment of the invention.

The inside of the side panel 16 is depicted in an enlarged reproduction in FIG. 2, wherein it can be recognized that the latter consists of a sheet metal part and comprises an outer side wall 20 as well as an inner side wall 22. The lower end of the outer side wall 20 is bent inwards and turned in the direction of the inner side wall 22 and forms a guide section 24, to which reference is made in more detail in FIG. 3. In addition, the functional element 18 can be recognized, which comprises an information section 26 lying on the visible outer side wall 20 as well as a fastening section 28 resting on the inner side wall 22. The fastening section 28 extends starting from the lower end of the vertical information section 26 around the lower end of the side panel 16 and upwards along the functional section 24. In this regard, it can be recognized that the fastening section 28 comprises a substantially horizontal base section 30, a pivot bearing section 32 adjoined thereto, a central section 34 as well as a clamping section 36.

Figure 3:
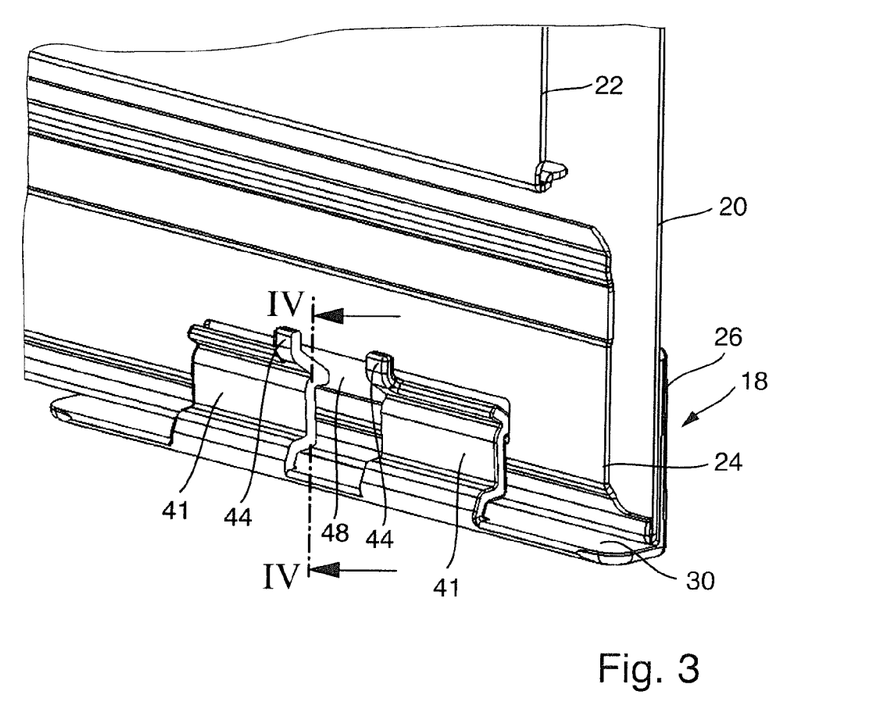
FIG. 3 an enlarged reproduction of the section III according to FIG. 2.

The fastening section 28 is formed substantially by a sliding guide element 38 as well as a fastener 40. The base section 30 extends in this sliding guide element 38, wherein fastener 40 are formed by the pivot bearing section 32 and central section 34. Lastly, the fastener 40 pass in the form of clamping fingers 41 into clamping element 42 as well as position fixing element 44, in which the clamping section 36 is located.

It can be recognized that the clamping element 42 comprise a clamping lug 46, which penetrates into a fixing seat 48 provided on the guide section 24. The fixing seat 48 is formed by a rectangular cut out, which is, however, only provided on the rear side of the side panel 16, i.e. on the guide section 24 and thus the outer side wall 20 is not damaged and is not visible from outside.

Figure 4:
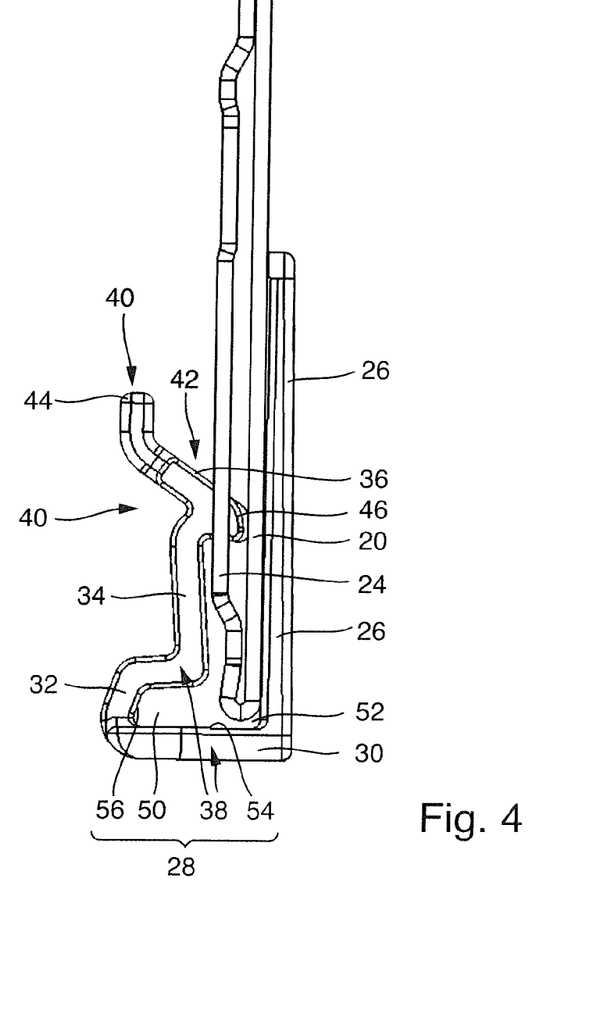
FIG. 4 a longitudinal section IV-IV through the section according to FIG. 3.

In order to be able to position the functional element 18 accurately, the fastening section 28 comprises the sliding guide element 38, in which a guide groove 50 is located. This guide groove 50 is formed on the inside of the information section 26 by a first groove wall 52, a groove base 54 as well as a second groove wall 56, which is provided on the inside of the pivot bearing section 32. The guide section 24 now sits in this guide groove 50 such that the functional element 18 can be slid orthogonally to the drawing plane or onto the latter from below. As soon as the clamping lugs 46 align with the fixing seat 48, these lock in and fix the functional element 18.

Dismantling of the functional element 18 takes place manually in that the clamping lugs 46 are removed from the fixing seat 48 by bending the fastener 40 at the position fixing element 44. The functional element 18 is either a sheet metal part or an injection molded part and thus elastic.

Figure 5:
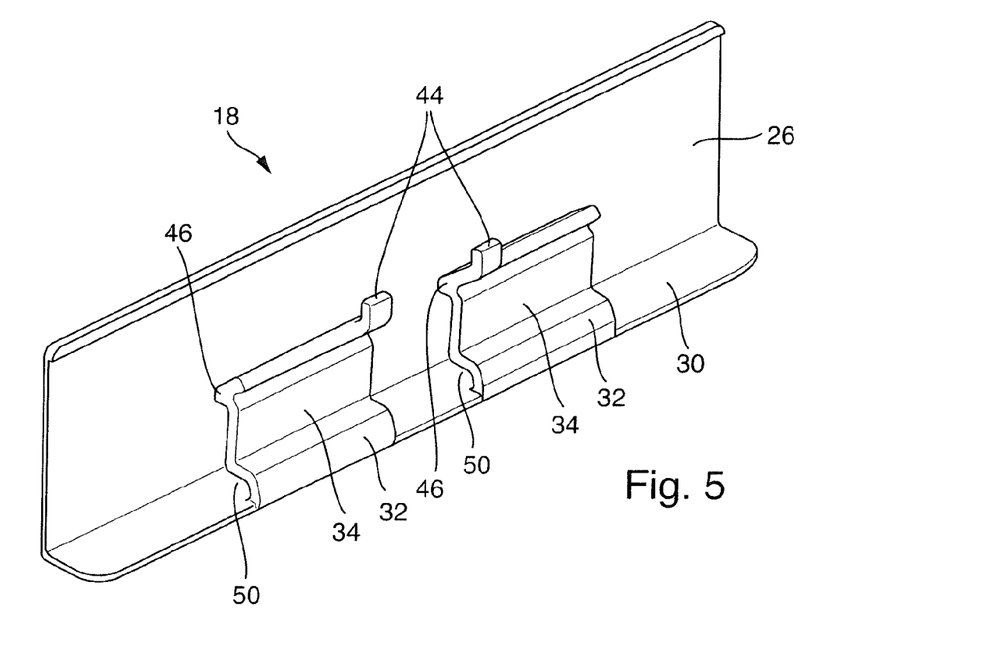
FIG. 5 a perspective view of the rear side of the functional element according to the invention.

The rear side of the functional element 18 is depicted in FIG. 5 in a perspective position and the individual components are clearly recognizable. In particular the position fixing element 44, which can be gripped with one or two fingers, are recognizable such that the clamping lugs 46 can be removed from the fixing seat 48. Both the guide groove 50 and the central section 34 serve to guide the functional element 18 during the sliding onto the side panel 16 of the furniture part 12 and subsequent positioning on the furniture part 12.

Figure 6:
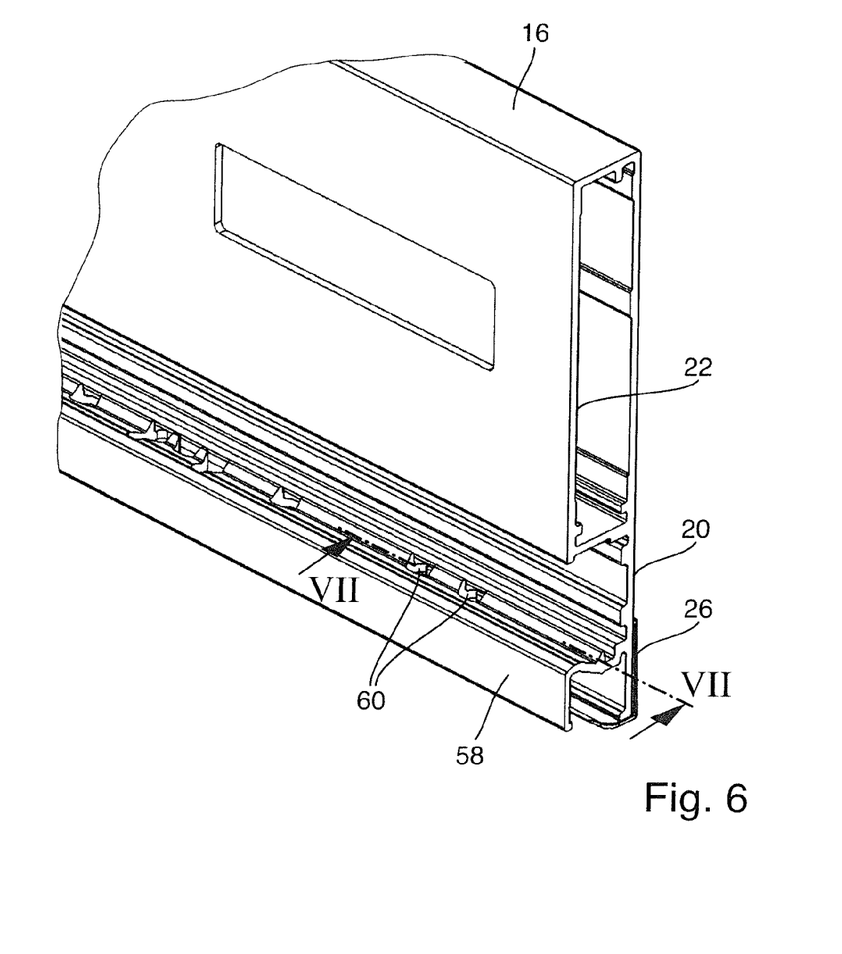
FIG. 6 a perspective view of the inside of a section of the side panel according to a second exemplary embodiment of the invention.
Figure 7:
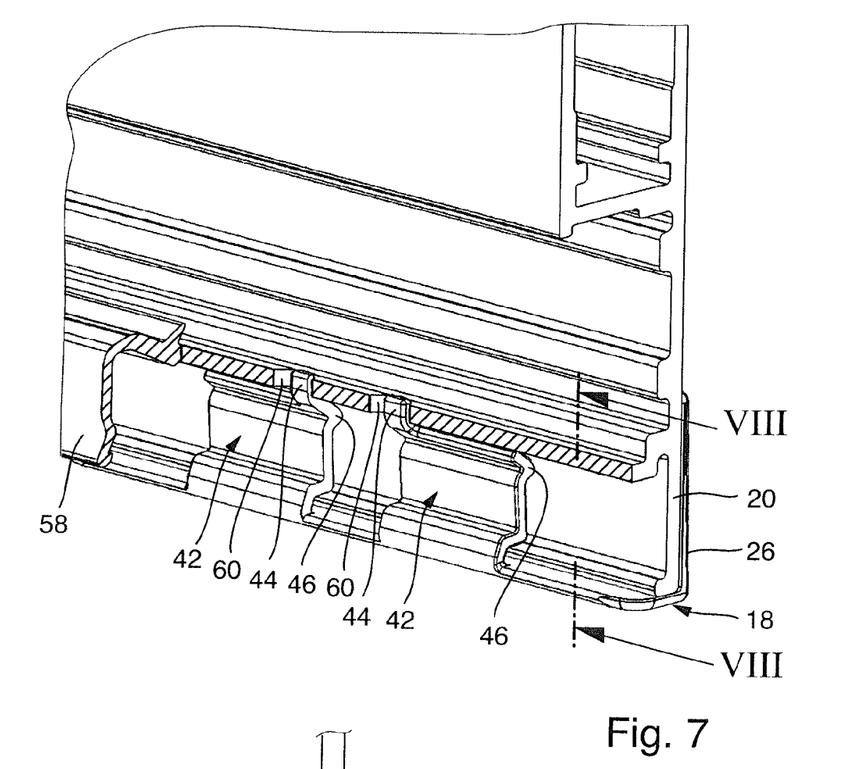
FIG. 7 an enlarged reproduction of the cut out VII-VII according to FIG. 6.
Figure 8:
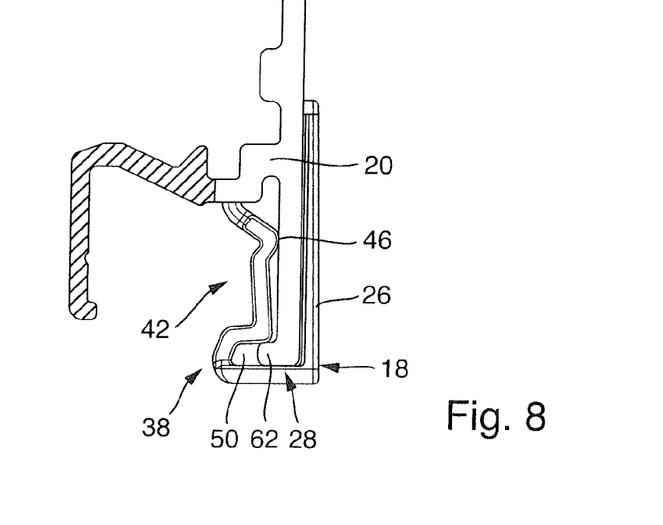
FIG. 8 a longitudinal section VIII-VIII through the cut out according to FIG. 7.

FIGS. 6 to 8 show the functional element 18 on a second side panel 16, which consists of a pressure die-cast element, e.g., of an aluminum alloy. In particular a guide strip 58 is formed on the rear side of the outer side wall 20 of the side panel 16. This guide strip 58 serves, e.g., for receiving the edge of a base of the pull-out 10 and can also receive, e.g., parts of a rail or telescopic rail. Seats 60 are provided on the upper side of the guide strip 58, into which the position fixing element 44 of the functional element 18 penetrate. The two clamping lugs 46 of the clamping element 42 only rest on the inner surface of the outer side wall 20, however they do not engage through the latter.

It should still be emphasized that the lower end of the outer side wall 20 is provided with a foot 62 protruding inwards, which penetrates into the guide groove 50 of the fastening section 28 and is overlapped by the sliding guide element 38 on the upper side. In this way, the functional element 18 is prevented from being pulled downwards. The sliding guide element 38 only allow sliding of the functional element 18 onto the lower end of the outer side wall 20 of the side panel 16 of the furniture part 12 in the direction orthogonal to the plane of FIG. 8.

Functional elements 18 of this type can thus be mounted trouble-free without tools on a side panel 16 and dismounted again or even exchanged, without the visible surface of the side panel 16 being damaged thereby.

What is claimed is:

1. A furniture part, comprising:
   a front plate having a rear surface;
   a side panel extending perpendicularly from the rear surface of the front plate, the side panel comprising an inner side wall and an outer side wall, a lower end of the outer side wall being bent inwards toward the inner side wall to form a guide section; and
   a furniture part functional element for decoration or information display, comprising:
      a planar information section; and
      a fastening section equipped with a fastener configured to fasten to the guide section of the side panel, wherein the fastener of the fastening section comprises:
         a sliding guide element to enable sliding of the furniture part functional element onto the guide section of the side panel; and
         a clamping element via which the slid-on furniture part functional element is held clamped to the guide section.

2. The furniture part according to claim 1, wherein the sliding guide element comprises a guide groove open to at least one front side of the furniture part, via which the furniture part is slidable from the front side onto the sliding guide element.

3. The furniture part according to claim 2, wherein the guide groove comprises two opposing groove walls, of which one is formed by a rear side of the information section and the other by the fastening section, and a groove base, which is formed by a base section connecting the information section and the fastening section to each other.

4. The furniture part according to claim 3, wherein the clamping element comprises at least one elastically flexible clamping finger that are elastically retractable for the sliding on of the furniture part functional element and subsequently lie in a clamping position in clamping engagement with the guide section of the furniture part.

5. The furniture part according to claim 4, wherein a plurality of clamping fingers are disposed in the longitudinal direction of the furniture part, arranged in series one behind the other.

6. The furniture part according to claim 4, wherein the at least one clamping finger comprises a pivot bearing section that is integrally attached to the base section of the guide groove.

7. The furniture part according to claim 4, wherein the at least one clamping finger comprises a central section arranged substantially parallel to the rear side of the information section in the clamping position.

8. The furniture part according to claim 4, wherein the clamping finger comprises a clamping section that lies in engagement with the guide section of the furniture part in the clamping position.

9. The furniture part according to claim 8, further comprising at least one clamping lug protruding inwards towards the information section and being arranged on the clamping section.

10. The furniture part according to claim 4, further comprising a position fixing element configured to fix the position of the furniture part functional element in the slid-on state and counter to a sliding direction.

11. The furniture part according to claim 10, wherein the position fixing element comprises at least one clamping lug disposed on the at least one clamping finger, which penetrates into a fixing seat on the guide section of the furniture part in the slid-on state in a desired position of the furniture part functional element.

12. The furniture part according to claim 1, wherein the information section comprises a planar, deepened or raised front side that is provided with a print reproducing information.

13. The furniture part according to claim 1, wherein the furniture part comprises at least one of: a plastic injection molded part, a stamped part, a sheet metal part, or a metal buckle.

14. The furniture part according to claim 1, wherein the furniture part comprises a door, a drawer, a pull-out, or a cover.

* * * * *